United States Patent
Lin et al.

(12) 
(10) Patent No.: US 7,376,850 B2
(45) Date of Patent: May 20, 2008

(54) METHODS OF COMPUTER POWER STATUS MANAGEMENT AND COMPUTERS UTILIZING THE SAME

(75) Inventors: Chih-Hsiung Lin, Taipei (TW); Jing-Rung Wang, Taipei (TW)

(73) Assignee: Via Technologies, Inc., Taipei (TW)

( * ) Notice: Subject to any disclaimer, the term of this patent is extended or adjusted under 35 U.S.C. 154(b) by 443 days.

(21) Appl. No.: 11/181,082

(22) Filed: Jul. 14, 2005

(65) Prior Publication Data
US 2006/0112292 A1    May 25, 2006

(30) Foreign Application Priority Data
Nov. 24, 2004   (TW) .............................. 93136134 A

(51) Int. Cl.
*G06F 1/00*   (2006.01)
*G06F 1/26*   (2006.01)
(52) U.S. Cl. .................. 713/322; 713/300; 713/320
(58) Field of Classification Search ................ 713/322
See application file for complete search history.

(56) References Cited

U.S. PATENT DOCUMENTS

| | | | |
|---|---|---|---|
| 6,243,817 B1 * | 6/2001 | Melo et al. | 713/300 |
| 7,225,346 B2 * | 5/2007 | Kawano et al. | 713/300 |
| 2006/0047986 A1 * | 3/2006 | Kurts et al. | 713/320 |

\* cited by examiner

*Primary Examiner*—Rehana Perveen
*Assistant Examiner*—Stefan Stoynov
(74) *Attorney, Agent, or Firm*—Thomas, Kayden, Horstemeyer & Risley

(57) ABSTRACT

A method of computer power state management. When an operating system thereof is idle and the processor thereof transits to a clock-suspended power state (C3/C4 state), an arbitrary bit is asserted to prevent requests from being passed through the Northbridge. When the processor is in the C3/C4 state, if a break event is received, the Southbridge transmits the break event to the Northbridge and changes the processor state from C3/C4 to C0 simultaneously. The break event is subsequently transmitted to the processor when the arbitrary bit is disabled.

31 Claims, 6 Drawing Sheets

METHODS OF COMPUTER POWER STATUS MANAGEMENT AND COMPUTERS UTILIZING THE SAME

BACKGROUND

The invention relates to power management, and in particular, to methods of transiting computer power states.

Currently, computers are increasingly conforming to the Advanced Configuration and Power Interface (ACPI) specification.

In computer 100 shown in FIG. 1, Northbridge 120 connects the Central Processing Unit (CPU) 110, main memory 160, and Southbridge 130 through buses. Southbridge 130 connects to Northbridge 120, storage device 140, and peripheral devices 150 through buses. Storage device 140 comprises operating system (OS) 141. Southbridge 130 comprises an arbitrary bit 131, such as the ACPI-defined ARB_DIS bit within the PM2_CNT register.

FIG. 2 is a schematic diagram of ACPI-defined processor power state. A CPU can execute instructions or move data while in a processor working state (C0 state). After computer 100 is idle for a predetermined period, CPU 110 enters one of the later-described power-saving states according to the OS 141, comprising ACPI-defined C1, C2, C3, and other states offering improved power savings over the C3 state, such as C4 state (not shown). The C3 state offers improved power savings over the C1 and C2 states. The C2 state offers improved power savings over the C1 state.

CPU 110 enters the C2 or C3/C4 state according to the bus master activity status of computer 100, such as BM_STS register. A bus master is an element of computer 100 controlling bus paths. When OS 141 determines that computer 100 has been idle for the predetermined period, CPU 110 enters the C3 or C4 state.

In a C2 power state, CPU 110 does not execute instructions but CPU 110 can snoop the bus master accesses to main memory 160. CPU 110 returns from the C2 state to C0 state when a break event occurs, such as an interrupt or an execution request.

In the C3/C4 state, CPU 110 does not snoop the bus master accesses to main memory 160 and further stops the clock.

Before CPU enters the C3/C4 state, arbitrary bit 131 will be turned on (e.g. ARB_DIS is assigned to 1) to prevent sending requests from Northbridge 120 to CPU 110. Thus, bus masters will not violate cache coherency.

CPU 110 must return from C3/C4 state to C0 state upon a break event, for example, when a bus master accesses main memory 160, when CPU 110 is required to execute instructions, or when an interrupt occurs.

Although the C3/C4 state uses less power than the C2 state, request response time in the C3/C4 state is longer than that for the C2 state.

Latency from receiving a request by Southbridge 130 to responding the request by CPU 110 includes the time for returning from the C3/C4 state to the C0 state, disabling arbitrary bit 131, transmitting the request from Southbridge 130 to Northbridge 120, and transmitting the request from Northbridge 120 to CPU 110.

FIG. 3 is a flowchart of conventional power state management procedures. First, when CPU 110 is in the C3/C4 state, Southbridge 130 receives a break event from peripheral devices 150 which CPU 110 needs to execute instructions or move data (step S302). Southbridge 130 directs CPU 110 to transit from the C3/C4 state to the C0 state (step S304). When CPU 110 is in the C0 state, arbitrary bit 131 is disabled (step S306). Southbridge 130 then transmits the request to Northbridge 120 (step S308) Northbridge 120 subsequently transmits the request to CPU 110 (step S310).

Hence, when a request is received in the C3/C4 state, before responding to the request, transiting CPU 110 power state from the C3/C4 state to the C0 state, disabling arbitrary bit 131, and transmitting the request from Southbridge 130 to Northbridge 120 and then to CPU 110 is required. Thus, the response time is considerably long, which may cause sluggish video playback.

SUMMARY

Accordingly, methods of computer power states management and computers utilizing the same are provided.

An exemplary embodiment of method of computer power state management includes: while a CPU is in a C0 state, receiving a break event by a first control chip, such as a Southbridge; transiting the CPU power state from C3/C4 state to C0 state, at the same time, transmitting the break event to a second control chip, such as Northbridge; when the CPU is in C0 state, disabling a arbitrary bit; transmitting the break event from the second chip to the CPU.

Computer system of the present invention with power state management include: a CPU having at least three power states such as clock-suspended state (ex. C3/C4 state), snoop state (ex. C2 state), and work state (ex. C0 state); a first control chip coupling to the CPU; and a second control chip coupling to the first control chip. When the CPU is in clock-suspended state (C3/C4 state) and the second control chip receives a break event, power state of the CPU is transited from C3/c4 state to C0 state and at the same time, the break event is transmitted to the first control chip. After the CPU is in the work state (c0 state), the break event passes through the first control and executed by the CPU.

DESCRIPTION OF THE DRAWINGS

The invention can be more fully understood by reading the subsequent detailed description and examples with references made to the accompanying drawings, wherein.

DETAILED DESCRIPTION

Methods of switching computer power states and computers utilizing the same are provided to reduce request response latency.

Figure 1:
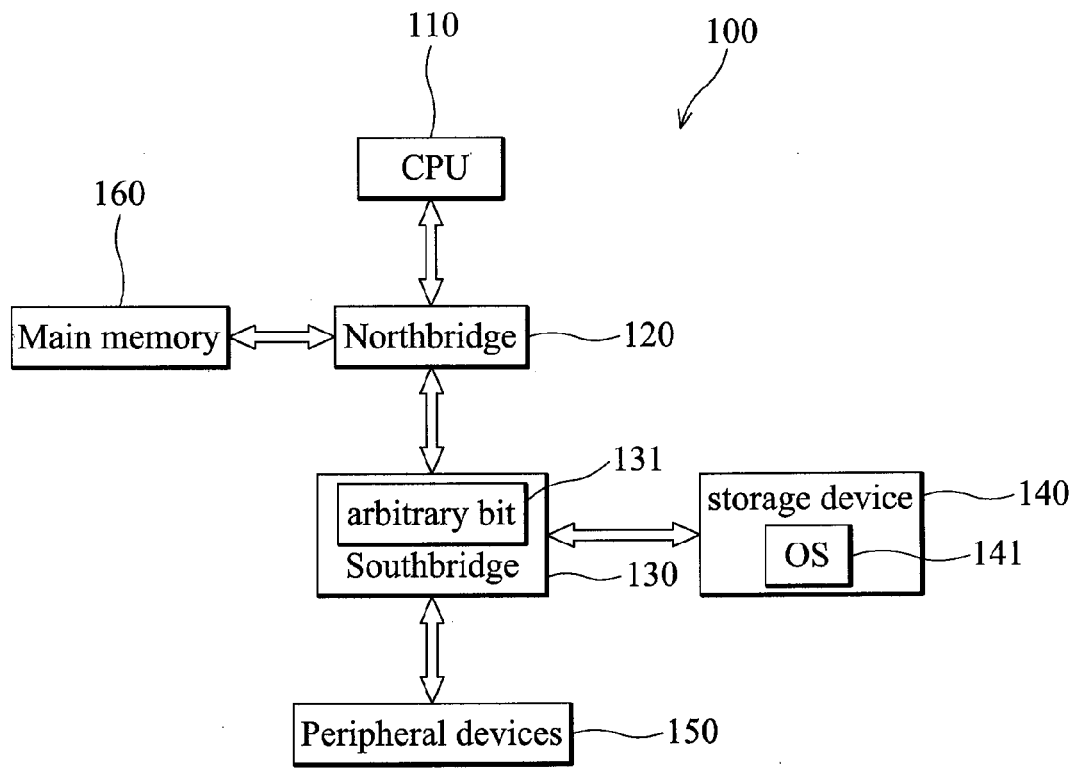
FIG. 1 is block diagram of the configuration of a conventional computer.
Figure 2:
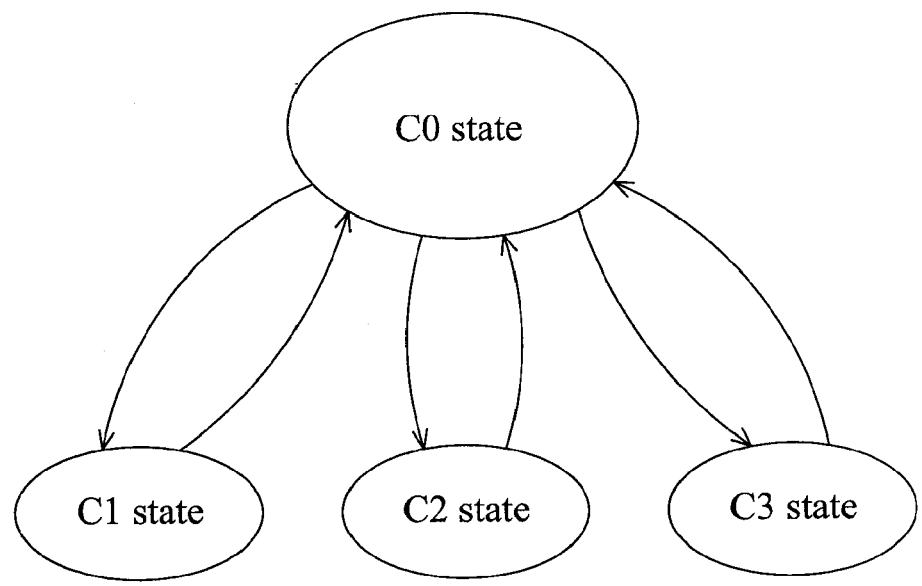
FIG. 2 is a schematic diagram of ACPI-defined processor power states.
Figure 3:
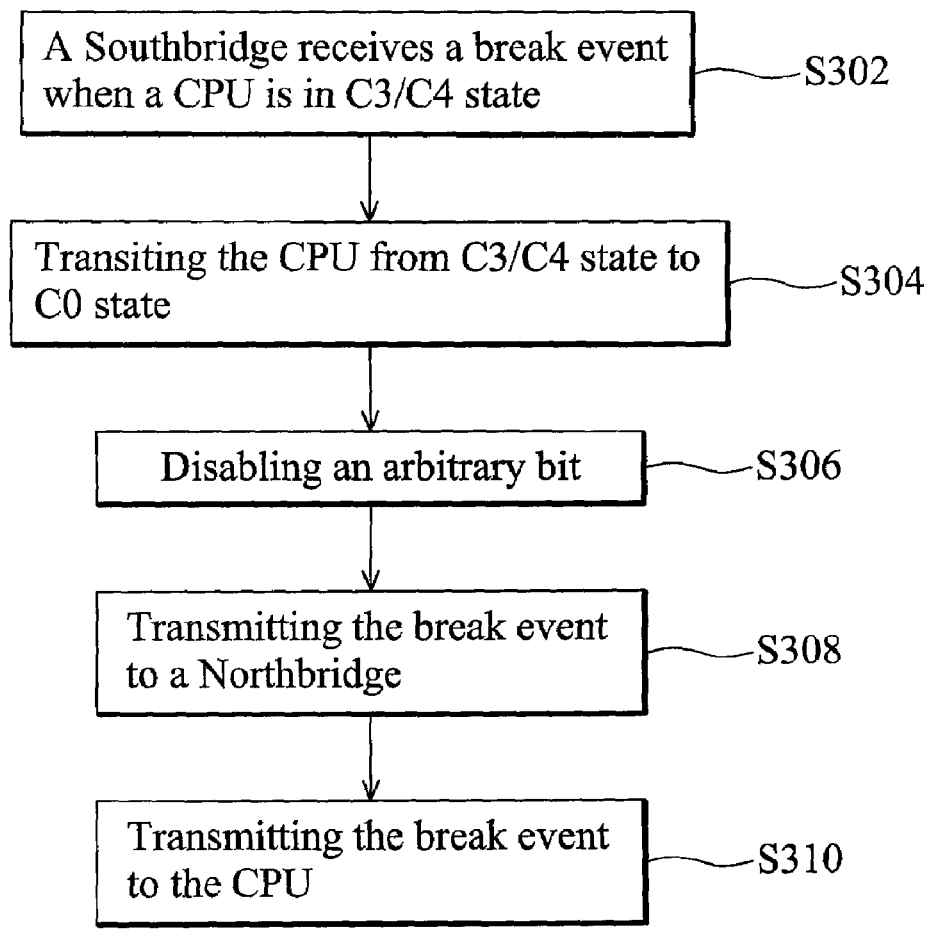
FIG. 3 is a flowchart of conventional computer power state management procedures.
Figure 4:
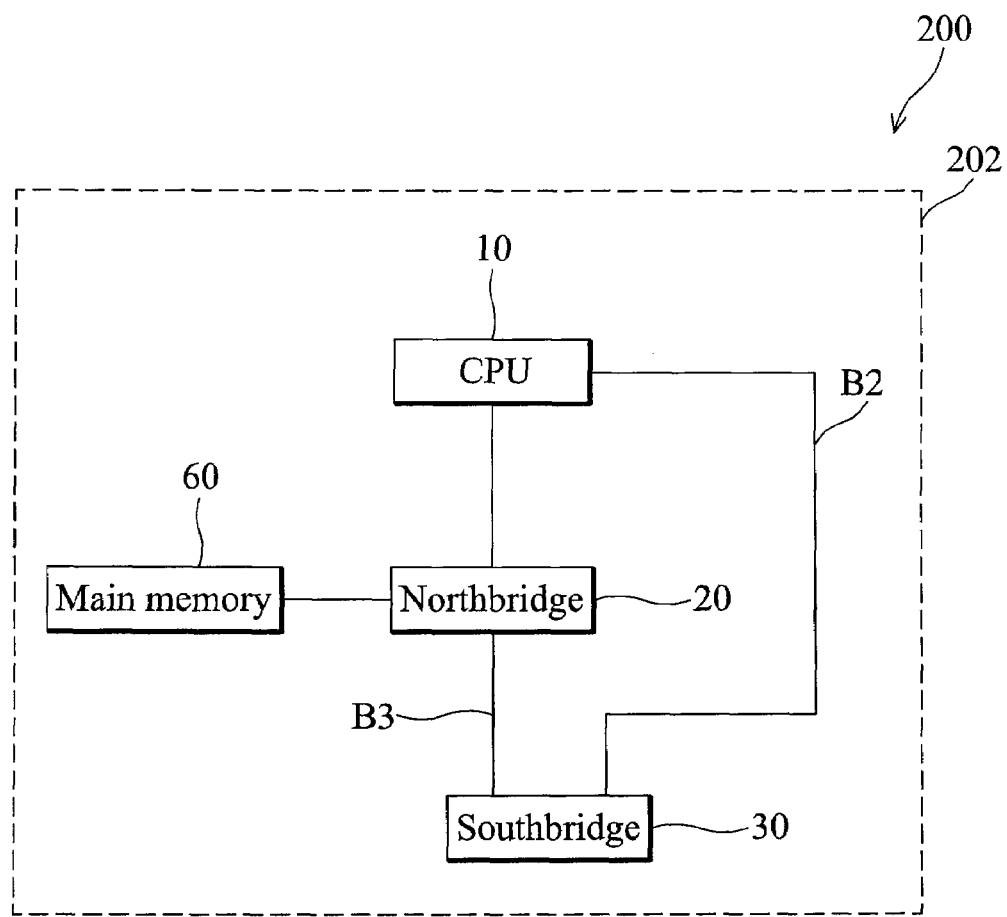
FIG. 4 is block diagram of the configuration of an exemplary embodiment of a computer.

FIG. 4 shows a computer system 200 with power state management of the present invention. The computer system 200 may be a personal computer, a notebook, or other computer device.

The computer system 200 with power state management of the present invention includes: a CPU 10, a Northbridge 20, a Southbridge 30, and a main memory 60.

The Northbridge 20, coupled between the CPU 10, the Southbridge 30, and the main memory 60, is in charge of high clock signals transmitting.

Southbridge 30 couples to Northbridge 20, storage devices, and peripheral devices. The storage devices have an operating system (OS). Southbridge 30 transfers low clock signals.

Computer system 200 further includes an arbitrary bit, such as the ACPI-defined ARB_DIS bit within the PM2_CNT register, which may be located in Northbridge 20 or elsewhere in computer 200.

When the arbitrary bit is asserted (ARB_DIS=1), requests are forbidden from passing through Northbridge 20. When the arbitrary bit is disabled (ARB_DIS=0), requests are allowed to pass through Northbridge 20.

In an example, Southbridge 30 directs CPU power states by utilizing a bus B2 connected to the CPU 10.

Assuming initial power state of the computer system 200 is in C0 state. When the OS determines that computer system 200 is idle for the predetermined period, CPU 110 transits from the C0 state to the C2 or C3/C4 state according to the bus master activity status of computer system 200, such as BM_STS register.

When any bus master is active, CPU 10 may enter the C2 state (the snoop state). If no bus master operation takes place, CPU 10 can assert the arbitrary bit (ARB_DIS=1) and enter the C3/C4 state.

Figure 5:
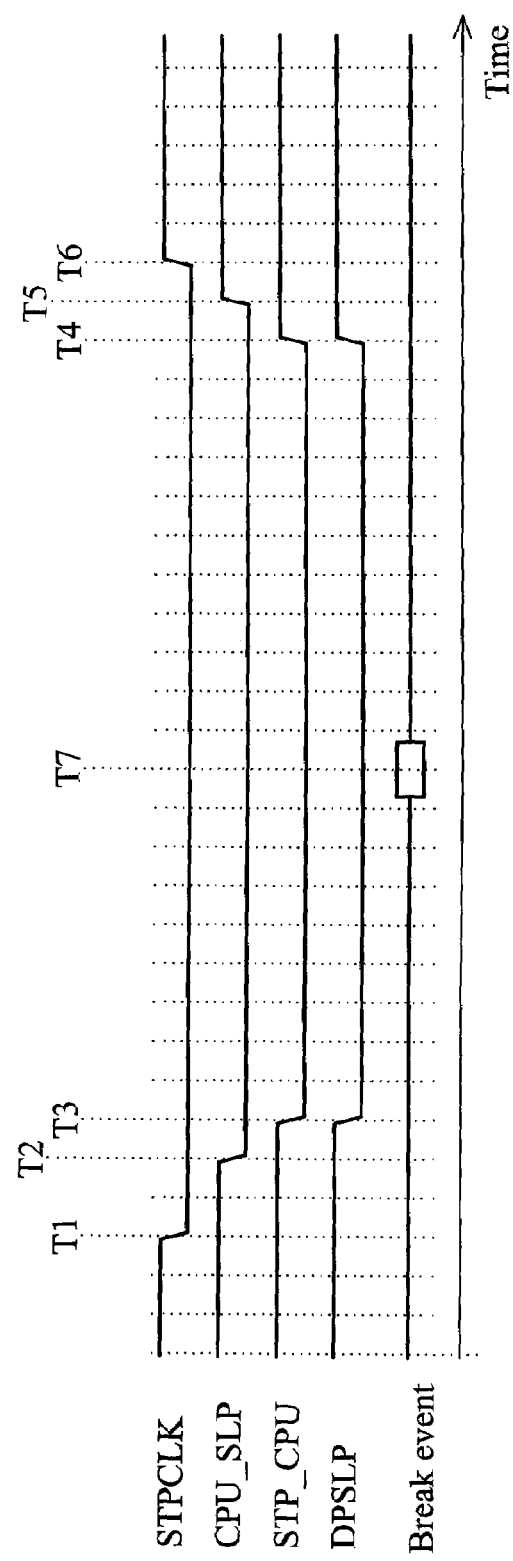
FIG. 5 is schematic diagram of power state management signals.

CPU 10 has four pins connected to bus B2, including a first pin STPCLK#, a second pin CPU_SLP#, a third pin STP_CPU#, and a fourth pin DPSLP#. Power state management signals of those four pins are shown in FIG. 5. Southbridge 30 directs CPU 10 to transit from the C0 state to the C2 state by utilizing the first pin STPCLK at time T1; directs CPU 10 to transit from the C2 state to the C3 state by utilizing the second pin CPU_SLP# at time T2; stops clock of CPU 10 by utilizing the third pin STP_CPU# at time T3; and directs CPU 10 to transit from the C3 state to the C4 state by utilizing the fourth pin DPSLP# at time T3.

In the C2 or C3/C4 state, CPU 10 does not execute any power management process provided by the OS. Thus, Southbridge 30 manages power states of CPU 10 according to requests received from bus masters.

When a bus master issues a request requiring CPU 10 to transit from the C3/C4 state to the C0 state, the request causes a break event.

When Southbridge 30 receives a break event while CPU 10 is in the C3/C4 or another clock-suspended state (for example, in FIG. 5, Southbridge 30 receives a request at time Track ball module 7), Southbridge 30 directs transiting CPU 10 from the C3/C4 state to the C0 by utilizing bus B2 to respond the request.

Figure 6:
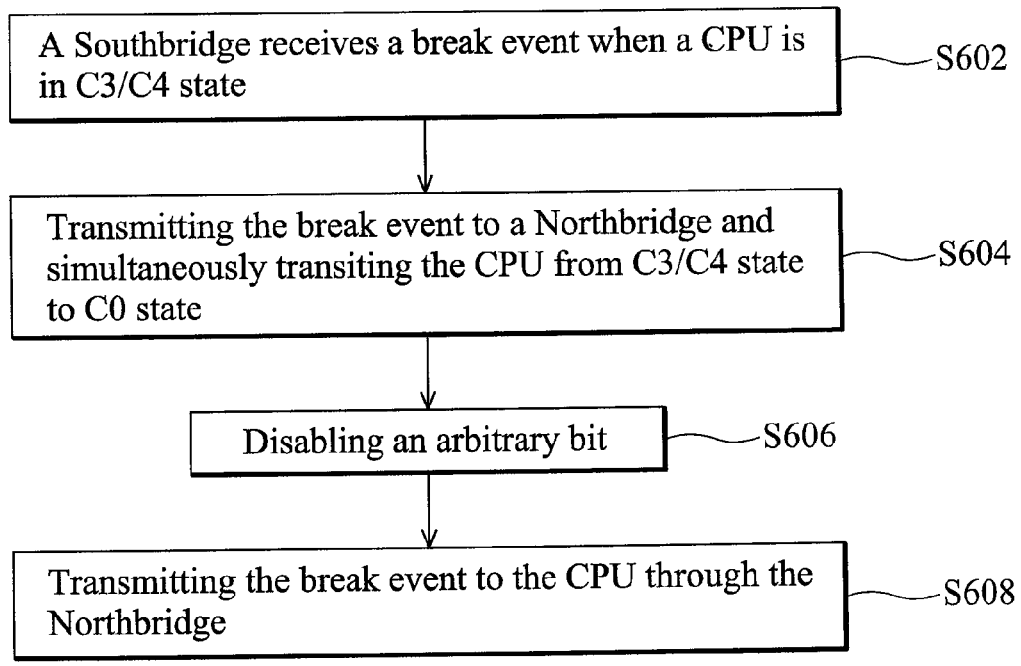
FIG. 6 is a flowchart of power state management procedures of the present invention.

Detailed procedures required before responding to the break event are described with reference FIG. 6.

First, Southbridge 30 receives a break event from a bus master, such as a peripheral device (step S602). Southbridge 30 transmits the break event to the Northbridge 20 for buffering, at the same time, transiting CPU 10 from the C3/C4 state to the C0 state by utilizing bus B2 (step S604)

The arbitrary bit is disable (ARB_DIS=0) when the CPU 10 is in the C0 state (step S606). The break event is transmitted to CPU 10 through Northbridge 20 (step S608).

Referring to FIG. 5, Southbridge 30 recovers CPU clock and directs CPU 10 to transit from the C4 state to the C3 state by utilizing third pin STP_CPU# and the fourth pin DPSLP# at time T4; directs CPU 10 to transit from the C3 state to the C2 state by utilizing the second pin CPU_SLP# at time T5; and directs CPU to transit 10 from the C2 state to the C0 state by utilizing the first pin STPCLK# at time T6.

In the previous description, Southbridge 30 directs CPU to transit from the C3/C4 state to the C0 state by utilizing bus B2 bypassing Northbridge 20. In another example, Southbridge 30 can direct CPU to transit from the C3/C4 state to the C0 state by utilizing Northbridge 20. As described, before CPU 10 enters the C3/C4 state, the arbitrary bit will be asserted (ARB_DIS =1) to prevent requests from reaching CPU 10 through Northbridge 20. Protocol between Northbridge 20 and Southbridge 30, however, can be utilized to pass state switching signals to CPU 10 through Northbridge 20 when the arbitrary bit is asserted (ARB_DIS =1).

Hence, the received request can be transmitted to Northbridge 20 for buffering before the arbitrary bit is disabled (ARB_DIS=0). With reference to FIG. 5, Southbridge 30 can transmit the request to Northbridge 20 at time T4, T5, or T6.

In conclusion, transmission of the break event to Northbridge 20 and transiting CPU 10 from C3/C4 to C0 state can be performed simultaneously to reduce request response time.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method of computer power state management, implemented in a computer with a Central Processing Unit (CPU), a Northbridge, and a Southbridge, wherein an arbitrary bit is asserted when the CPU is in a clock-suspended state, comprising:

receiving a request by the Southbridge;

transmitting the request to the Northbridge for buffering and transiting the CPU to a processor working state simultaneously;

disabling the arbitrary bit; and transmitting the request to the CPU.

2. The method as claimed in claim 1, wherein the CPU is transited from the clock-suspended state to a snoop state and then to the processor working state.

3. The method as claimed in claim 1, wherein the arbitrary bit is located in the Northbridge.

4. The method as claimed in claim 1, wherein the arbitrary bit is asserted or disabled by an operating system (OS).

5. The method as claimed in claim 1, wherein the request is forbidden from reaching the CPU through the Northbridge while the arbitrary bit is asserted.

6. The method as claimed in claim 1, wherein the Southbridge directs the CPU to transit from the clock-suspended state to the processor working state by a bus connected to the CPU.

7. The method as claimed in claim 1, wherein the Southbridge directs the CPU to transit from the clock-suspended state to the processor working state by utilizing protocol between the Southbridge and the Northbridge.

8. The method as claimed in claim 1, wherein the computer conforms to the ACPI specification.

9. The method as claimed in claim 1, wherein the CPU enters the clock-suspended state after a predetermined idle period.

10. A method of computer power state management, implemented in a computer, comprising:
- receiving a request by a first control chip while the computer is in a clock-suspended state;
- transmitting the request to a second control chip and transiting the computer to a working state simultaneously;
- passing the request through the second control chip when the computer is in the working state; and
- responding the request.

11. The method as claimed in claim 10, wherein requests are forbidden from passing through the second control chip while the computer is in the clock-suspended state.

12. The method as claimed in claim 10, wherein the computer is transited from the clock-suspended state to a snoop state and then to the working state.

13. The method as claimed in claim 10, wherein the computer further comprises an arbitrary bit, further comprising when the computer is in the clock-suspended state, asserting the arbitrary bit to prevent the request from passing through the second control chip.

14. The method as claimed in claim 13, wherein when the computer is in the working state, further comprising disabling the arbitrary bit to allow the request passing through the second control chip.

15. The method as claimed in claim 14, wherein the arbitrary bit is asserted or disabled by utilizing an operating system (OS).

16. The method as claimed in claim 13, wherein the arbitrary bit is located in the second control chip.

17. The method as claimed in claim 10, wherein the first control chip is a Southbridge.

18. The method as claimed in claim 10, wherein the second control chip computer is a Northbridge.

19. The method as claimed in claim 10, wherein the computer conforms to the ACPI specification.

20. A computer system with power state management, comprising:
- a Central Processing Unit (CPU) comprising at least a clock-suspended state, a snoop state, and a processor working state;
- a first control chip couples to the CPU; and
- a second control chip couples to the first control chip, wherein the second control chip receives a request while the CPU is in the clock-suspended state, if the request requires processing by the CPU, the request is transmitted to the first control chip for buffering and the CPU is transited from the clock-suspended state to the processor working state simultaneously, and the request is transmitted to the CPU through the first control chip when the CPU is in the processor working state.

21. The computer as claimed in claim 20, wherein the first control chip comprises an arbitrary bit, when the CPU is in the clock-suspended state, the arbitrary bit is asserted accordingly.

22. The computer as claimed in claim 21, wherein when the arbitrary bit is asserted, the request is forbidden from passing through the first control chip.

23. The computer as claimed in claim 21, wherein when the CPU is in the processor working state, the arbitrary bit is disabled accordingly.

24. The computer as claimed in claim 21, wherein when the arbitrary bit is disabled, the request is allowed to pass through the first control chip.

25. The computer as claimed in claim 23, wherein the arbitrary bit is turned asserted or disabled by an operating system (OS).

26. The computer as claimed in claim 20, wherein the CPU is transited from the clock-suspended state to the snooping state and then to the processor working state.

27. The computer as claimed in claim 20, wherein the second control chip directs the CPU to transit from the clock-suspended state to the processor working state by utilizing a bus connecting to the CPU.

28. The computer as claimed in claim 20, wherein the second control chip directs the CPU to transit from the clock-suspended state to the processor working state by utilizing protocol between the second control chip and the first control chip.

29. The computer as claimed in claim 20, wherein the first control chip is a Northbridge.

30. The computer as claimed in claim 20, wherein the second control chip is a Southbridge.

31. The computer as claimed in claim 20, wherein the computer conforms to the ACPI specification.

* * * * *